May 1, 1923.  
L. BIERSCHBACH  
SAFETY ATTACHMENT FOR TRACTORS  
Filed Oct. 7, 1920  
1,453,264

Inventor  
Leander Bierschbach

By Geo. P. Kimmel  
Attorney

Patented May 1, 1923.

1,453,264

UNITED STATES PATENT OFFICE.

LEANDER BIERSCHBACH, OF MOUNT PLEASANT, MICHIGAN.

SAFETY ATTACHMENT FOR TRACTORS.

Application filed October 7, 1920. Serial No. 415,438.

*To all whom it may concern:*

Be it known that I, LEANDER BIERSCHBACH, a citizen of the United States, residing at Mount Pleasant, in the county of Isabella and State of Michigan, have invented certain new and useful Improvements in Safety Attachments for Tractors, of which the following is a specification.

This invention relates to tractor attachments and more particularly to safety attachments for tractors.

The object of the invention is to provide an attachment for preventing backward tipping of a tractor incident to the blocking of the drive wheels.

Another object is to provide a simple and efficient attachment of this character which may be readily applied to any tractor and connected with the clutch to throw said clutch automatically into neutral position when the tractor for any reason rears in front thereby preventing all possibility of the tipping over backwards of a tractor endangering the driver's life in addition to wrecking the machine.

It is well known that tractors, if the driver loses his head and fails to release the clutch, will rear up in front and tip over backwards when the drive wheels are blocked and sufficient power is applied to the differential, oftentimes crushing the driver and wrecking the tractor and it is to prevent such accidents that this attachment is designed.

With these and other objects in view, the invention consists in certain novel features of construction as hereinafter shown and described, and then specifically pointed out in the claims, and in the drawings illustrative of the preferred embodiment of the invention.

In the embodiment illustrated the attachment constituting this invention is shown applied to a tractor T being mounted on the housing of the rear axle A thereof, said tractor being equipped with the usual front wheels W and driving wheels DW. The attachment may be applied to tractors of any make but is especially designed for use in connection with Fordson tractors.

Figure 1:
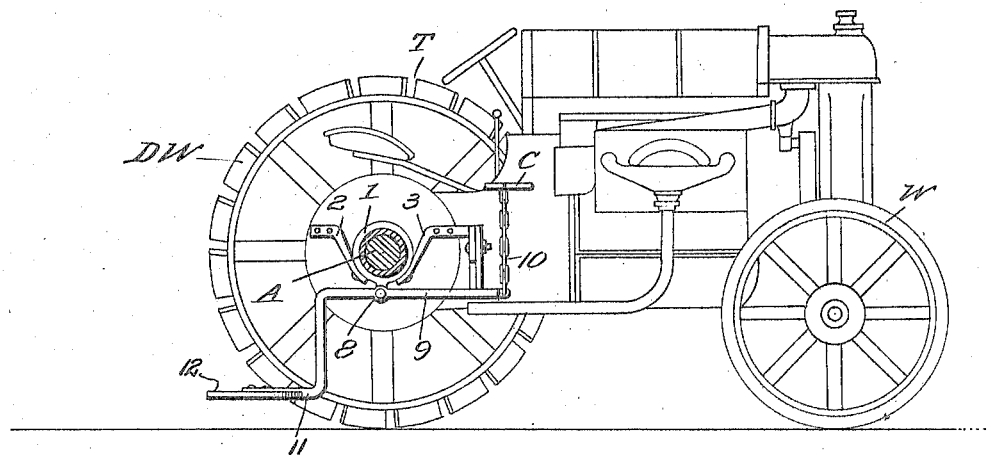
Figure 1 represents a side elevation of a tractor showing this improved attachment applied and in inoperative normal position.
Figure 2:
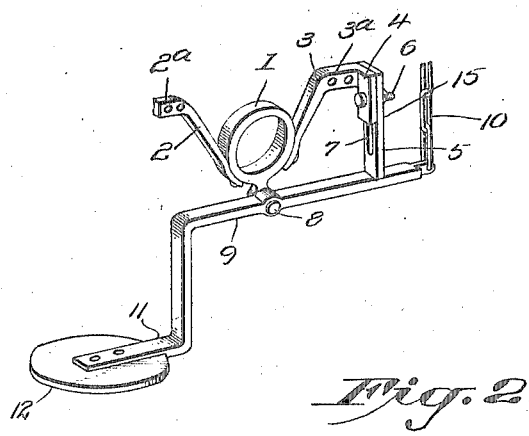
Fig. 2 is a perspective view of the attachment detached.

The attachment comprises a connecting band or ring 1 which is designed to encircle the axle housing of the tractor drive wheel and has projecting laterally from opposite points of its perimeter diverging attaching holding arms 2 and 3 which are secured to the lower part of the band and have their free ends projecting laterally and apertured to form attaching fingers or lugs $2^a$ and $3^a$, and through which extend hold-fast devices for fixedly securing said arms in position, as illustrated in Figure 1 of the drawings. The finger $3^a$ is of greater length than the finger $2^a$. Extending downwardly at right angles from the finger $3^a$, as well as integral therewith, is a plate 4 which constitutes the fixed or stationary member of an adjustable bumper 15. The movable member 5 of the bumper is mounted for longitudinal adjustment on the member 4 by means of a set screw 6 which passes through said member 4 and through a longitudinally disposed slot 7 in the member 5 and which is designed for a purpose presently to be described.

Fulcrumed on a stud 8 projecting laterally from one face of the bottom of band 1 is a lever 9. One end of this lever projects beyond and under the bumper and has connected with its terminal a chain 10 which unites the lever with the clutch C of the tractor as is shown clearly in Fig. 1 so that when a downward movement is imparted to this end of the lever a pull will be exerted on chain 10 sufficient to release the clutch. The other end of the lever 9 is offset downwardly and extended rearwardly, the offset extension 11 thereof carrying at its free end a shoe 12, the weight of which normally holds the chain carrying end of the lever in engagement with the bumper and avoids any pull being exerted on the chain 10 such as would operate to release the clutch. This shoe 12 in addition to forming a counterweight for the lever is designed to engage the ground when the tractor rears and thereby exert a pull on chain 10 sufficient to release the clutch C throwing the drive wheels out of operation and permitting the tractor to lower into normal position, thereby avoiding danger to the driver and injury to the machine.

The attachment is normally suspended as shown in Fig. 1 and should the tractor rear in front incident to blocking of the drive wheels or otherwise, the shoe 12 will come in contact with the ground thereby moving the other end of the lever down and exerting a pull on the chain to release the clutch. This automatic release of the clutch by engagement of the shoe 12 with the ground is especially useful should the driver lose his head or for any reason fail to throw out the clutch when the tractor tips or rears upward.

The adjustable bumper provides for the adjusting of the shoe 12 at different heights relatively to the ground by operating as a stop to prevent the chain carrying end of the lever from rising beyond a predetermined point.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

1. An attachment of the class described comprising an axle encircling band having diverging holding arms fixed thereto, an adjustable bumper depending from one of said arms, and a lever fulcrumed intermediate its ends on said band and having one end extended under said bumper and provided with a clutch connecting element, the other end of said lever being offset and provided at its terminal with a shoe.

2. An attachment for the purpose set forth comprising a stationary axle encircling band provided with a holding means therefor, a bumper extended from said means, a lever fulcrumed intermediate its ends on said band and having one end extended under and projecting beyond said bumper, a clutch operating element for connecting that end of the lever which projects beyond the bumper with a clutch and normally in inactive position, said lever having its other end offset, and means carried by the offset end of the lever for maintaining the other end of the lever against the bumper whereby vertical movement thereof is arrested.

3. A device for the purpose set forth comprising a supporting element adapted to be mounted on the axle of a tractor and provided with a pair of holding arms, a bumper depending from one of said arms and including a stationary and an adjustable section, a lever fulcrumed intermediate its ends to and arranged below said supporting element, means carried by one end of the lever for maintaining the other end thereof against said bumper to arrest upward movement of said latter end, and a clutch operating means carried by the lever and normally in inactive position.

In testimony whereof I affix my signature hereto.

LEANDER BIERSCHBACH.